(12) United States Patent
Goldberg

(10) Patent No.: US 11,412,091 B2
(45) Date of Patent: Aug. 9, 2022

(54) INTERCOM SYSTEM WITH RELAY GATEWAY

(71) Applicant: Goldcom, Inc., Farmingdale, NY (US)

(72) Inventor: Mark S. Goldberg, Northport, NY (US)

(73) Assignee: GOLDCOM, INC., Farmingdale, NY (US)

( * ) Notice: Subject to any disclaimer, the term of this patent is extended or adjusted under 35 U.S.C. 154(b) by 18 days.

(21) Appl. No.: 16/734,538

(22) Filed: Jan. 6, 2020

(65) Prior Publication Data

US 2020/0220981 A1 Jul. 9, 2020

Related U.S. Application Data

(60) Provisional application No. 62/788,403, filed on Jan. 4, 2019.

(51) Int. Cl.
*H04M 11/02* (2006.01)
*H04M 7/12* (2006.01)

(52) U.S. Cl.
CPC ......... *H04M 11/025* (2013.01); *H04M 7/125* (2013.01)

(58) Field of Classification Search
USPC ......... 379/159, 160, 167.01, 167.02, 167.04, 379/167.05
See application file for complete search history.

(56) References Cited

U.S. PATENT DOCUMENTS

| 2012/0028589 A1* | 2/2012 | Fan | H04M 11/025 |
| | | | 455/90.2 |
| 2016/0241660 A1* | 8/2016 | Nhu | H04L 67/04 |
| 2017/0289359 A1* | 10/2017 | Keller | H04M 11/025 |

* cited by examiner

*Primary Examiner* — Yosef K Laekemariam
(74) *Attorney, Agent, or Firm* — Myers Wolin, LLC

(57) ABSTRACT

An embodiment of the present disclosure provides an intercom system including a cloud server, and a relay gateway. The cloud server is configured to receive a trigger signal from a visitor door station, and to send a notification when the cloud server receives the trigger signal from the visitor door station. In one embodiment, the relay gateway is configured to receive the notification from the cloud server and to send the notification to one of a plurality of local intercom stations via one of plurality of hard wires, the hard wires being connected to the local intercom stations, respectively. In one embodiment, the cloud server is configured to send the notification to a remote intercom device that corresponds to the one of the plurality of the local intercom stations.

7 Claims, 1 Drawing Sheet

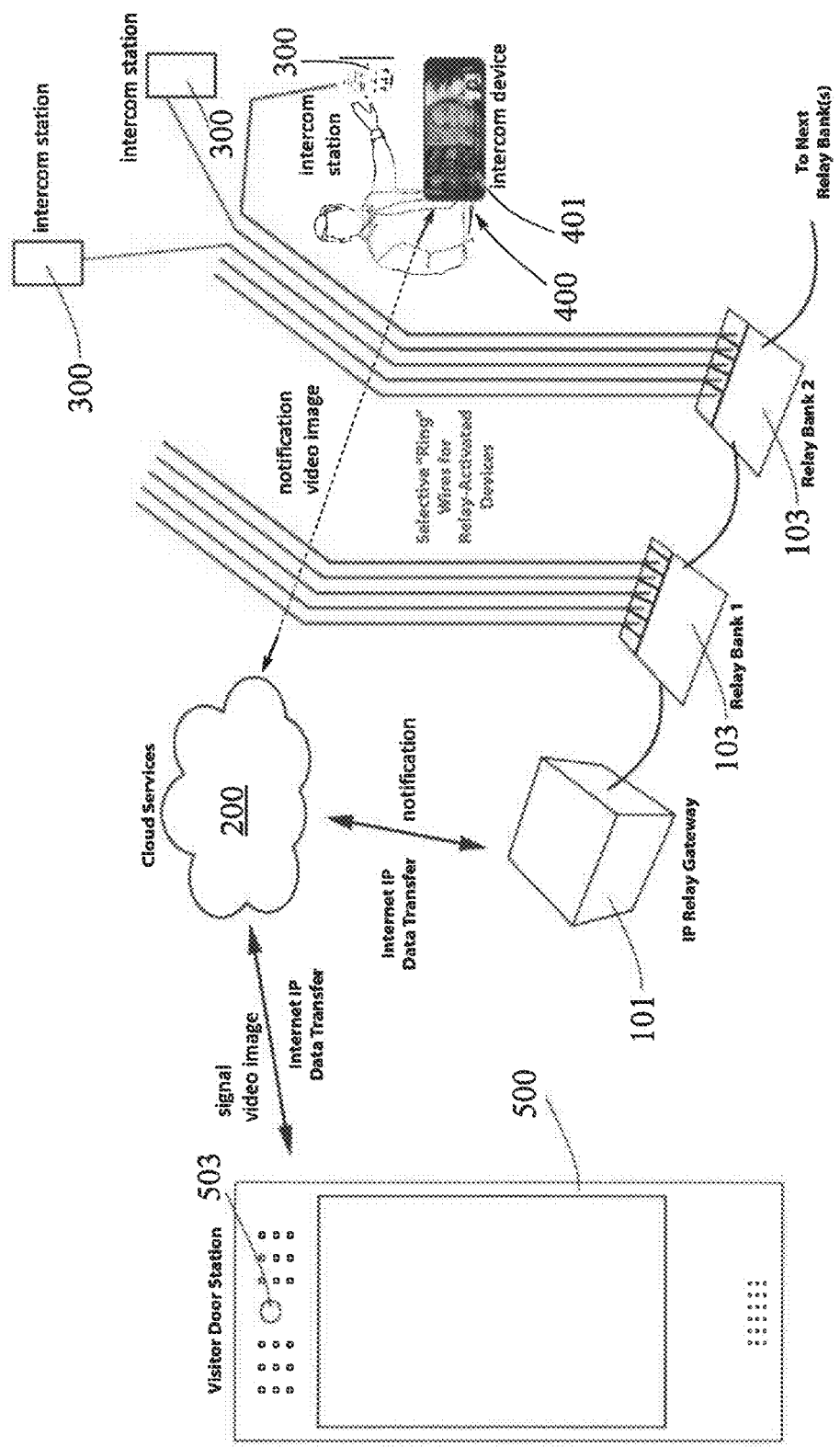

INTERCOM SYSTEM WITH RELAY GATEWAY

CROSS REFERENCES TO RELATED APPLICATIONS

This application claims the benefit of U.S. Provisional Patent Application No. 62/788,403 filed on Jan. 4, 2019. The disclosure and entire teachings of U.S. Provisional Patent Application 62/788,403 are hereby incorporated by reference

FIELD

The present disclosure generally relates to an intercom system with a relay gateway.

BACKGROUND

For decades multi-family buildings (apartment houses and commercial office buildings) have installed analog type intercom systems to be able to speak with visitors to the building and allow them entry using an electric door strike or mag lock.

More recently, multi-unit entrance systems have gone to IP (internet protocol) technology and allow visitors to a building to call to the building residents on a smart phone application or the like. This technology allows the residents to, among other things, see visitors to the building, speak to them and allow them entry using an electric door strike or magnetic lock, from anywhere in the world where they have an internet connection.

While an analog intercom system may have been adequate security decades ago, today's building residents and guests want to be able to see the visitors at the door as well as speak to them.

Up until recently, the only way to accomplish this may have been to remove the existing analog intercom system, and install a new hard-wired video-intercom system. To do so required running new wiring to all of the apartments/suites in the building (in most cases), and installing all new video-intercom monitor stations in each apartment/suite. New central equipment may be required to power the system and new lobby entry door stations may be required as well. The residents may have to take time off from work to stay home during the running of the wiring and installation of the devices in their apartments/suites.

Therefore, the new breed of IP "smart" video-intercom systems has been created. The new systems typically do not require running any physical wiring to the resident's apartment/suite, there are no video-intercom monitors required to be installed in each apartment/suite, and none of the residents need to stay home from work during the installation.

However, there are certain downsides to these new systems. In certain jurisdictions (e.g., New York City) there is a building code that requires a "hard-wired intercom device to be installed in each apartment/suite." (see for example Title 27, Chapter 1, Sub-Chapter 6 of the New York City Building Code) This would mean that these new "smart" video-intercom systems could not be installed in certain cities and may need to meet the current building codes.

Also, in some buildings there may be elderly residents who have not embraced the new technology and do not have a smart phone onto which the software application can be installed to get a call from the door entry station(s). In lower income areas some residents simply cannot afford a smart phone, which keeps them from being able to receive calls from visitors using solely an IP based system.

Another situation is that although these new "smart" video-intercom systems are relatively low cost to install and have a lot of features, some building managers and building residents have concerns that if the internet connection is lost, they would not be able to receive any calls from visitors.

SUMMARY

An embodiment of the present disclosure provides an intercom system. In one embodiment, an intercom system includes a cloud server, and a relay gateway. The cloud server is configured to receive a trigger signal, preferably a trigger signal from a visitor door station, and to send a notification when the cloud server receives the trigger signal from the visitor door station. The relay gateway is configured to receive the notification from the cloud server and to send the notification to one of a plurality of local intercom stations via one of a plurality of hard wires. The hard wires being connected to the local intercom stations, respectively. The cloud server is configured to send the notification to a remote intercom device that corresponds to the one of the plurality of the local intercom stations.

BRIEF DESCRIPTION OF THE DRAWINGS

FIG. 1 illustrates a schematic diagram of one embodiment of an intercom system according to the present disclosure.

DETAILED DESCRIPTION OF THE PREFERRED EMBODIMENTS

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

The embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

The present embodiment may allow residents of a building to add the "smart" video-intercom capability they want, while maintaining their existing analog intercom as a back-up system, or to meet certain building code requirements, or for residents that do not have a smart phone and/or are happy with the existing analog intercom system.

One embodiment of the present disclosure mates the capabilities of a "smart" video-intercom system to work in conjunction with an existing (or new) analog type intercom system. This embodiment may provide every resident with the ability to see who is at the entry door (if the residents have smart phones and choose to install certain software applications), while maintaining a hard-wired intercom system for back-up purposes, code compliance purposes, or when a smart phone application cannot be utilized.

Another embodiment may encompass some additional hardware to mimic the mechanical push-button switches on an analog intercom door station.

On a typical analog intercom system there may be typically a wire that is "home-run" from a push-button switch at the door entry station to an individual analog local intercom station in a resident housing unit. The wire may be called the "selective" or "ring" wire. When a visitor presses that individual push-button switch at the door entry station, it may send a voltage to that individual intercom station to produce a call sound/tone at that apartment/suite local intercom station.

FIG. 1 illustrates one embodiment of an intercom system of the present disclosure including a gateway device 101 that connects to a cloud server(s) 200 and has a unique MAC address. The gateway device 101 may receive signals from the cloud server 200 that can be triggered from at least one of the local intercom station 300 and a remote intercom device 400. Connected to the gateway device 101 are smart relay boards that are addressable. Each individual relay on these boards may be a form 'C' relay and the duration of the relay closure can be controlled by a data signal sent to that specific relay. Other configurations are possible.

As shown in the embodiment of FIG. 1, a visitor door station 500 may also be provided. The visitor door station 500 may include a push-button switch or a touch icon or other means of allowing a visitor to access information associated with a building occupant. In one example, the visitor door may further include a camera 503 acquiring a video image. The visitor door station 500 may connect to the cloud server 200 through any type of connection that is wired, wireless or a combination of the same, or through other means now known or hereinafter developed. The visitor door station 500 may be configured to send the video image to the cloud server 200.

In one embodiment, when a push-button switch is pushed or the touch icon is touched, for example, a smart visitor door station 500 may place a call to a building resident, and may send a trigger signal to the cloud server 200. When the cloud server 200 receives the trigger signal from the visitor door station 500, the cloud server 200 may be triggered to send a notification to a remote intercom device 400 (e.g., smart phones or other type of device) of a corresponding resident of that apartment/suite telling that the resident has a call from a visitor. As such the resident may accept the call to see and speak to the visitor.

Further, the cloud server 200 may be configured to send the video image from the visitor door station 500 to the intercom device 400 such that a monitor 401 of the intercom device 400 displays the video image. Therefore, the resident may see who is at the entry door. Then, the resident may unlock a door of the apartment/suite or at the entrance of the building. This may be realized, for example, by touching an unlock icon on the remote intercom device 400. When the unlock icon is touched, a signal for unlocking the door may be sent to the door of the apartment/suite via the cloud server 200 and the gateway device 101, or to the door at the entrance of the building via the cloud server 200. In one embodiment, the resident also has an option to provide building access to a visitor using the hardwired intercom station. Other configurations are contemplated.

At the same time, in one embodiment, the cloud server 200 may send a signal to the gateway device 101 telling the gateway device 101 to send a data signal to a specific relay board and specific relay on that board to activate for a certain period (e.g., several seconds). The period may depend on the number of seconds that has been programmed ahead of time. This relay may connect to the selective/ring wire from the existing analog intercom system. Therefore, the residents of that apartment/suite may get their notification and also the residents' analog intercom station may sound, allowing them to answer and remotely open the entry door from either device.

Implementation of the intercom system of the present embodiment may not require running any new wiring to each apartment/suite (unless it is for a new construction application where they want the analog intercom system to back up the "smart" video-intercom system), nor may it require any new devices in each apartment/suite to replace the existing analog station. One embodiment of the present disclosure may allow the intercom system to meet any building code that requires a hard-wired device in each apartment/suite, while at the same time provide residents and visitors with increased functionality through use of the cloud server and IP relay gateway. Further the present embodiment may still allow the residents who choose to do so to have all of the features and benefits of the newer smart video intercom system, without disrupting existing hard-wire-based intercom system architecture.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An intercom system comprising:
a visitor door station configured to send a trigger signal;
a cloud server configured to receive the trigger signal, and to send first and second notifications when the cloud server receives the trigger signal; and
a relay gateway configured to receive the first notification from the cloud server and to send the first notification to one of a plurality of analog local intercom stations via one of a plurality of hard wires, the hard wires being connected to the analog local intercom stations, respectively,
wherein the cloud server is configured to, in response to the same trigger signal received by the cloud server from the visitor door station:
send the first notification to the one of the plurality of analog local intercom stations via the relay gateway such that the one of the plurality of local intercom stations receives the first notification as an analog signal; and
wirelessly send the second notification to a wireless remote intercom device that corresponds to the one of the plurality of the analog local intercom stations.

2. The intercom system of claim 1, further comprising at least one relay bank, one of the hard wires being electrically disposed between one of the at least one relay bank and one of the plurality of the analog local intercom stations,
wherein when the relay gateway receives the first notification from the cloud server, the relay gateway is configured to send the first notification to one of analog plurality of analog local intercom stations via one of the at least one relay bank.

3. The intercom system of claim 1, wherein the cloud server is further configured to receive a video image and to wirelessly send the video image to the wireless remote intercom device, and the video image wirelessly sent to the wireless remote intercom device is not included in the first notification; and
the wireless remote intercom device comprises a monitor configured to display the video image.

4. The intercom system of claim 3, further comprising a visitor door station configured to send the trigger signal to the cloud server, wherein the visitor door station is configured to be connected to the wireless remote intercom device via the cloud server;
wherein the visitor door station comprises a camera acquiring a video image, the visitor door station being configured to send the video image acquired by the camera to the cloud server;
the cloud server is further configured to send the video image from the visitor door station to the wireless remote intercom device; and
the wireless remote intercom device comprises a monitor configured to display the video image.

5. The intercom system of claim 1, wherein the cloud server is configured to wirelessly send the second notification such that the wireless remote intercom device receives the second notification as a digital signal.

6. The intercom system of claim 1, wherein the cloud server is configured to wirelessly send the second notification, without transmitting via the relay gateway, to the wireless remote intercom device.

7. The intercom system of claim 1, wherein the cloud server is configured to wirelessly send to the relay gateway the first notification as a digital signal.

* * * * *